(12) United States Patent
Bae et al.

(10) Patent No.: US 12,379,298 B2
(45) Date of Patent: Aug. 5, 2025

(54) DEFECTIVE POROUS SHEET DETECTION SYSTEM AND DETECTION METHOD

(71) Applicant: LG ENERGY SOLUTION, LTD., Seoul (KR)

(72) Inventors: Won-Sik Bae, Daejeon (KR); Sang-Min Kwak, Daejeon (KR); Joo-Sung Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 217 days.

(21) Appl. No.: 17/918,438

(22) PCT Filed: Jul. 8, 2021

(86) PCT No.: PCT/KR2021/008754
§ 371 (c)(1),
(2) Date: Oct. 12, 2022

(87) PCT Pub. No.: WO2022/010294
PCT Pub. Date: Jan. 13, 2022

(65) Prior Publication Data
US 2023/0138842 A1    May 4, 2023

(30) Foreign Application Priority Data
Jul. 8, 2020   (KR) ........................ 10-2020-0084325

(51) Int. Cl.
*G01N 15/08*    (2006.01)

(52) U.S. Cl.
CPC ... *G01N 15/0806* (2013.01); *G01N 2015/084* (2013.01)

(58) Field of Classification Search
None
See application file for complete search history.

(56) References Cited

U.S. PATENT DOCUMENTS

| 2005/0019665 A1 | 1/2005 | Adachi et al. |
| 2009/0042008 A1 | 2/2009 | Kimishima et al. |
| 2009/0170005 A1* | 7/2009 | Kimishima ......... H01M 50/423 429/249 |

(Continued)

FOREIGN PATENT DOCUMENTS

| CN | 1578806 A | 2/2005 |
| CN | 109374492 A | 2/2019 |

(Continued)

OTHER PUBLICATIONS

English translation of Cheng et al. CN 109374492 A (Year: 2019).*

(Continued)

*Primary Examiner* — Laura Martin
*Assistant Examiner* — Mark A Shabman
(74) *Attorney, Agent, or Firm* — Morgan, Lewis & Bockius LLP (57) ABSTRACT

A system for detecting a defective porous sheet includes a jig having a through-hole, a heating unit, a temperature sensor, a controlling unit, an air permeability-determining unit and a judging unit. In this manner, it is possible to provide a novel system for detecting a porous sheet, which may be a defective separator after being coated with a porous coating layer, beforehand by using the air permeability and shutdown temperature of the porous sheet itself.

10 Claims, 5 Drawing Sheets

(56) References Cited

U.S. PATENT DOCUMENTS

| | | |
|---|---|---|
| 2013/0224632 A1 | 8/2013 | Roumi |
| 2019/0237733 A1 | 8/2019 | Zhang et al. |
| 2021/0080364 A1 | 3/2021 | Lee et al. |
| 2021/0218112 A1 | 7/2021 | Yamamoto et al. |

FOREIGN PATENT DOCUMENTS

| | | |
|---|---|---|
| JP | 1997-126986 A | 5/1997 |
| JP | 2003-279465 A | 10/2003 |
| JP | WO2007/060991 A1 | 5/2007 |
| JP | 4573986 B2 | 11/2010 |
| JP | 2015-043288 A | 3/2015 |
| JP | 2020-043081 A | 3/2020 |
| JP | WO2020/121673 A1 | 6/2020 |
| KR | 10-2018-0024101 A | 3/2018 |
| KR | 10-2018-0111329 A | 10/2018 |
| KR | 10-2019-0113682 A | 10/2019 |
| KR | 10-2020-0002437 A | 1/2020 |

OTHER PUBLICATIONS

Extended European Search Report issued Sep. 14, 2023 in counterpart European Patent Application No. 21837801.6.

International Search Report (with partial translation) and Written Opinion dated Oct. 18, 2021, for corresponding International Patent Application No. PCT/KR2021/008754.

Office Action issued in related Korean Patent Application No. 10-2021-0090009 dated Feb. 4, 2024.

Office Action issued in related Chinese Patent Application No. 202180031005.9 dated Mar. 20, 2025.

* cited by examiner

DEFECTIVE POROUS SHEET DETECTION SYSTEM AND DETECTION METHOD

TECHNICAL FIELD

The present disclosure relates to a system and method for detecting a detective porous sheet. Particularly, the present disclosure relates to a system for detecting a defective porous sheet using the shut-down temperature and air permeability of a porous sheet itself.

The present application claims priority to Korean Patent Application No. 10-2020-0084325 filed on Jul. 8, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles.

In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

The separator used for a lithium secondary battery functions to physically interrupt the positive electrode and the negative electrode from being in contact with each other and to insulate the positive electrode and the negative electrode electrically from each other, while allowing lithium ion transport. Particularly, the separator is known to significantly affect the characteristics and safety of a battery in that it functions to retain insulation property for preventing an internal short-circuit of the battery.

Such a separator frequently uses a porous polymer substrate, but is problematic in that it may undergo heat shrinking at high temperature to cause an internal short-circuit between a positive electrode and a negative electrode. To solve the above-mentioned problem, an organic/inorganic porous coating layer, including inorganic particles and a binder polymer, has been applied onto the porous polymer substrate so that the heat shrinkage may be reduced.

Under these circumstances, the inventors of the present disclosure have found that even though the porous polymer substrate passes the standards of thickness and air permeability before being coated with the porous coating layer, the separator may cause an abnormal increase in air permeability (Gurley value) after the porous polymer substrate is provided with the organic/inorganic porous coating layer thereon. Therefore, the present disclosure is directed to providing a method for detecting a porous polymer substrate, which may cause such a problem, beforehand.

DISCLOSURE

Technical Problem

The present disclosure is designed to solve the problems of the related art, and therefore the present disclosure is directed to detecting a defective porous sheet beforehand by using the air permeability and shut-down temperature of the porous sheet itself.

The present disclosure is not limited to the above-mentioned technical problem, and other objects of the present disclosure may be understood from the following detailed description and will become more fully apparent from the exemplary embodiments of the present disclosure.

Technical Solution

In one aspect of the present disclosure, there is provided a system for detecting a defective porous sheet according to any one of the following embodiments.

According to the first embodiment, there is provided a system for detecting a defective porous sheet, including:
  an air permeability-determining unit 170 configured to determine the air permeability (Gurley value) of the porous sheet;
  a first jig 120 configured to fix one side of the porous sheet and having a first through-hole through which the air discharged from the air permeability-determining unit is introduced;
  a second jig 130 disposed at a position opposite to the first jig based on the porous sheet, configured to fix the other side of the porous sheet, and having a second through-hole through which the air passing through the first through-hole and the pores in the porous sheet is introduced;
  a heating unit 140 configured to heat the first jig or the second jig;
  a temperature sensor 150 configured to measure the temperature of the first jig or the second jig;
  a controlling unit 160 configured to control the heating unit and the temperature sensor; and
  a judging unit 200 configured to determine whether the porous sheet is defective or not,
  wherein the controlling unit 160 calculates the shut-down temperature of the porous sheet by using the temperature measured by the temperature sensor as a function of time and the air permeability (Gurley vale) of the porous sheet determined by the air permeability-determining unit, and
  the judging unit 200 determines the porous sheet as a defective porous sheet, when the shut-down temperature of the porous sheet calculated by the controlling unit is higher than a predetermined reference value.

According to the second embodiment, there is provided the system for detecting a defective porous sheet as defined in the first embodiment, wherein the air permeability-determining unit is linked to the first jig, and the controlling unit is linked to the first jig and the second jig.

According to the third embodiment, there is provided the system for detecting a defective porous sheet as defined in the first or the second embodiment, wherein the heating unit and the temperature sensor are linked to at least one of the first jig and the second jig.

According to the fourth embodiment, there is provided the system for detecting a defective porous sheet as defined in any one of the first to the third embodiments, wherein the porous sheet is interposed between the first jig and the second jig.

According to the fifth embodiment, there is provided the system for detecting a defective porous sheet as defined in any one of the first to the fourth embodiments, which further includes a display unit configured to display the temperature in X axis as a function of time and the air permeability (Gurley value) of the porous sheet in Y axis as a function of time.

According to the sixth embodiment, there is provided the system for detecting a defective porous sheet as defined in any one of the first to the fifth embodiments, wherein the shut-down temperature (A) is a temperature corresponding to an air permeability (Gurley value) of 100,000 sec/100 cc, when the temperature is increased as a function of time.

According to the seventh embodiment, there is provided the system for detecting a defective porous sheet as defined in any one of the first to the sixth embodiments, wherein the hole in the first through-hole and the hole in the second through-hole have an average diameter of 2-15 mm.

According to the eighth embodiment, there is provided the system for detecting a defective porous sheet as defined in any one of the first to the seventh embodiments, which further includes a storage unit configured to record the calculated shut-down temperature of the porous sheet.

According to the ninth embodiment, there is provided the system for detecting a defective porous sheet as defined in any one of the first to the eighth embodiments, which further includes a display unit configured to display the calculated shut-down temperature of the porous sheet.

In another aspect of the present disclosure, there is provided a method for detecting a defective porous sheet.

According to the tenth embodiment, there is provided a method for detecting a defective porous sheet, including the steps of:
  (a) interposing a porous sheet between a first jig 120 and a second jig 130 facing each other;
  (b) determining the air permeability of the porous sheet, while the air discharged from the air permeability-determining unit 170 passes through the first through-hole in the first jig 120, pores in the porous sheet and the second through-hole in the second jig 130 sequentially;
  (c) acquiring temperature as a function of time from the heating unit 140 configured to heat the first jig or the second jig and the temperature sensor 150 configured to measure the temperature of the first jig or the second jig;
  (d) allowing the controlling unit 160 to calculate the shut-down temperature of the porous sheet by using the temperature acquired from the temperature sensor 150 as a function of time and the air permeability of the porous sheet acquired from the air permeability-determining unit 170; and
  (e) allowing the judging unit 200 to determine the porous sheet as a defective porous sheet, when the shut-down temperature of the porous sheet calculated by the controlling unit is higher than a predetermined reference value.

According to the eleventh embodiment, there is provided the method for detecting a defective porous sheet as defined in the tenth embodiment, wherein the shut-down temperature (A) is a temperature corresponding to an air permeability (Gurley value) of 100,000 sec/100 cc, when the temperature is increased as a function of time.

According to the twelfth embodiment, there is provided the method for detecting a defective porous sheet as defined in the tenth or the eleventh embodiment, wherein step (e) includes determining a porous sheet having a shut-down temperature higher than the reference value by 0.5° C. or more as a defective porous sheet.

Advantageous Effects

According to an embodiment of the present disclosure, it is possible to provide a novel system for detecting a porous sheet, which may be a defective separator after being coated with a porous coating layer, beforehand by using the air permeability and shut-down temperature of the porous sheet itself.

The system requires a shorter time for determination as compared to the conventional systems, and allows accurate determination of the shut-down temperature of the porous sheet itself. In addition, there is an advantage in that it is not required to prepare a separate coin cell to determine the shut-down temperature of the porous sheet. There is another advantage in that it is not required to use an electrolyte in carrying out a safety test.

Further, it is possible to determine the specification of the porous sheet itself, beforehand, i.e. before the porous sheet is coated with a porous coating layer, and thus to provide high cost-efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

First, the overall constitution of the system for detecting a defective porous sheet according to an embodiment of the present disclosure will be explained with reference to FIG. 1.

Figure 1:
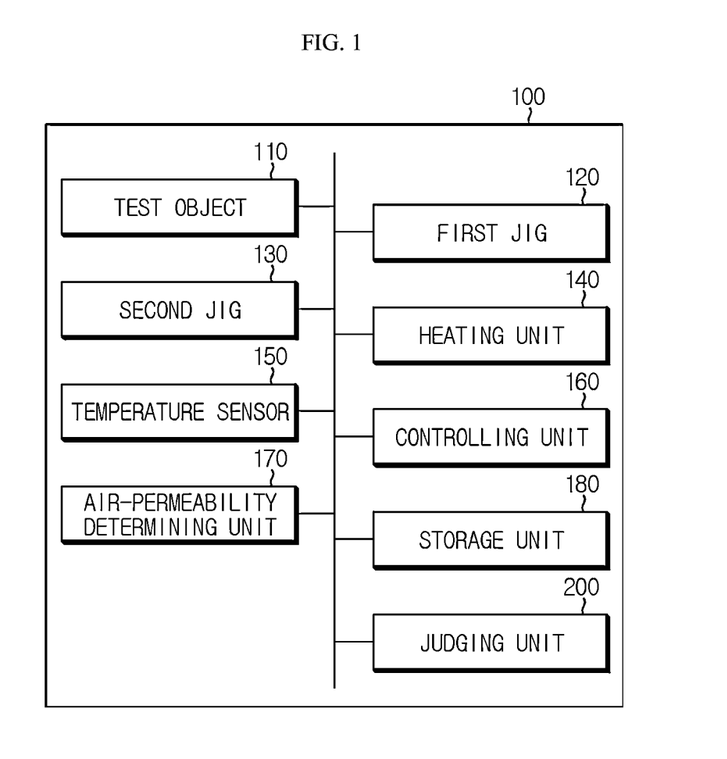
FIG. 1 is a schematic block diagram illustrating the constitution of the system for detecting a defective porous sheet according to an embodiment of the present disclosure.

FIG. 1 is a schematic view illustrating the constitution of the system for detecting a defective porous sheet according to an embodiment of the present disclosure.

Referring to FIG. 1, the system 100 for detecting a defective porous sheet according to an embodiment of the present disclosure is one capable of evaluating whether a test object 110 may be a defective product or not after being coated with a porous coating layer, and includes jigs 120, 130, a heating unit 140, a temperature sensor 150, a controlling unit 160, an air permeability-determining unit 170 and a judging unit 200. In addition, the system 100 for detecting a defective porous sheet according to an embodiment of the present disclosure may optionally further include a storage unit 180 and a display unit 190 (not shown).

The test object 110 may be a separator. Any separator may be used with no particular limitation, as long as it physically interrupts a contact between a negative electrode and a positive electrode and has electrical insulation property. An insulating thin film interposed between the positive electrode and the negative electrode and having high ion permeability and mechanical strength may be used as the separator. The separator has pores, and generally may have a pore diameter of 0.01-10 μm and a thickness of 5-300 μm. However, according to an embodiment of the present disclosure, the test object 100 means the porous sheet itself, which is not provided with a porous coating layer. Non-limiting examples of the porous sheet may include a sheet or nonwoven web made of an olefinic polymer, such as polyethylene or polypropylene, having chemical resistance and hydrophobicity, glass fibers, polyethylene, or the like. The porous sheet may be a solid electrolyte. In a variant, the porous sheet may include a crosslinked polyolefin separator including polyolefin, an alkoxy group-containing vinylsilane and a crosslinking catalyst.

The separator used for a lithium secondary battery functions to physically interrupt the positive electrode and the negative electrode from being in contact with each other and to insulate the positive electrode and the negative electrode electrically from each other, while allowing lithium ion transport. Particularly, the separator is known to significantly affect the characteristics and safety of a battery in that it functions to retain insulation property for preventing an internal short-circuit of the battery. Such a separator frequently uses a porous polymer substrate, but is problematic in that it may undergo heat shrinking at high temperature to cause an internal short-circuit between a positive electrode and a negative electrode. To solve the above-mentioned problem, an organic/inorganic porous coating layer, including inorganic particles and a binder polymer, has been applied onto the porous polymer substrate so that the heat shrinkage may be reduced.

Under these circumstances, the inventors of the present disclosure have found that even though the porous polymer substrate passes the standards of thickness and air permeability before being coated with the porous coating layer, the separator may cause an abnormal increase in air permeability (Gurley value) after the porous polymer substrate is provided with the organic/inorganic porous coating layer thereon. During the manufacture of the separator, when the porous polymer substrate is subjected to excessive heating due to a certain reason, the fibrils in the porous polymer substrate have significantly non-uniform thicknesses and rough surfaces. In this case, when the porous polymer substrate is coated with a porous coating layer, the air permeability is increased abnormally. Therefore, the present disclosure is directed to providing a method for detecting a defective porous polymer substrate, which may cause such a problem, beforehand by using the properties of the porous polymer substrate which show improved heat resistance when being subjected to excessive heating.

According to an embodiment of the present disclosure, it is possible to provide a novel system for detecting a porous sheet, which may be a defective porous separator after being coated with a porous coating layer, beforehand by using the air permeability and shut-down temperature of the porous sheet itself.

As used herein, the term 'shut-down temperature' refers to a specific point of temperature in a region wherein the air permeability (Gurley value) of a porous sheet is increased rapidly. Particularly, the shut-down temperature may be calculated from experimentally derived values. More particularly, the shut-down temperature may be calculated by using the controlling unit 160 as described hereinafter.

For example, the shut-down temperature may be determined as a temperature at which point the increment of air permeability is reduced in a range of temperature corresponding to an air permeability (Gurley value) of 10,000 sec/100 cc or more, when the temperature is increased as a function of time.

According to an embodiment of the present disclosure, the shut-down temperature may be determined as a temperature (A) at a specific point in a region wherein the air permeability is 10,000 sec/100 cc to 100,000 sec/100 cc. According to a particular embodiment, the shut-down temperature may be a temperature at a point corresponding to an air permeability of 10,000 sec/100 or 100,000 sec/100 cc.

Figure 4:
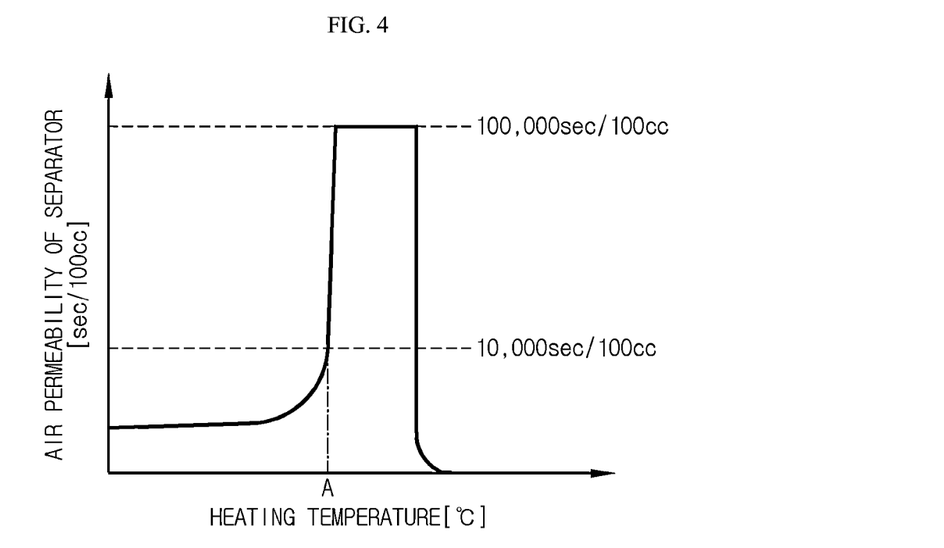
FIG. 4 is a graph illustrating the shut-down temperature of a porous separator plotted by using the temperature and air permeability (Gurley value) of the porous sheet as a function of time for the test object prepared according to Example 1-1.

Referring to FIG. 4, it is shown that after the air permeability is increased rapidly from 10,000 sec/100 cc to 100,000 sec/100 cc, it is not increased any longer beyond 100,000 sec/100 cc but is retained. Therefore, it can be seen that even when the shut-down temperature is determined as a specific point, A, in such a region, it shows no significant deviation from a point where the increment of air permeability is reduced actually.

FIG. 4 is a schematic view illustrating the shut-down temperature as defined herein. Referring to FIG. 4, X axis means a temperature (° C.) as a function of time. Referring to FIG. 4, Y axis means the air permeability (Gurley value) (sec/100 cc) of a separator as a function of time. In FIG. 4, the shut-down temperature is a temperature at a specific point in a region corresponding to an air permeability (Gurley value) of 10,000 sec/100 cc to 100,000 sec/100 cc, when the temperature is increased as a function of time, or a temperature at a point where the increment of air permeability is decreased, and may be represented by 'A'.

Figure 2:
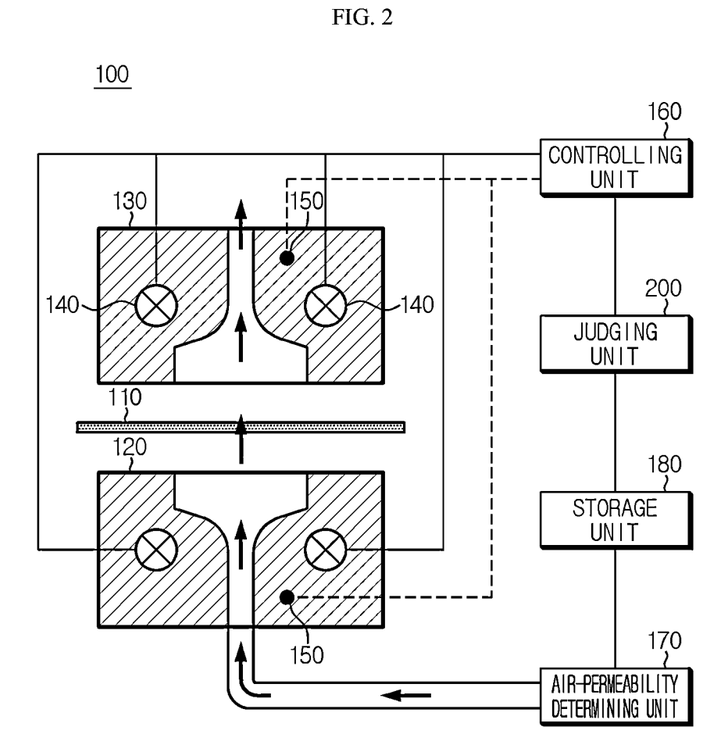
FIG. 2 is a schematic view illustrating the constitution of the system for detecting a defective porous sheet according to an embodiment of the present disclosure.

Referring to FIG. 1 and FIG. 2, the system includes a first jig 120 configured to fix one side of the porous sheet as a test object 110 and having a first through-hole through which the air discharged from the air permeability-determining unit is introduced. In addition, the system includes a second jig 130 disposed at a position opposite to the first jig based on the separator, configured to fix the other side of the porous sheet, and having a second through-hole through which the air passing through the first through-hole and the pores in the porous sheet is introduced.

The jigs 120, 130 are used for holding the test object 110 to be evaluated in terms of safety characteristics. The jigs may include the first jig 120 and the second jig 130 which may face each other. The jigs 120, 130 may include any material, as long as the material fixes the test object 110.

Each of the heating unit 140 and the temperature sensor 150 may be disposed on at least one of the first jig and the second jig. In addition, the porous sheet 110 may be interposed between the first jig 120 and the second jig 130. Meanwhile, the through-hole formed in the first jig or the second jig may penetrate from the lateral side of the first jig or the second jig to the top and bottom surfaces of the first jig or the second jig.

Referring to FIG. 1 and FIG. 2, the heating unit 140 may be provided in at least one of the first jig and the second jig. For example, the heating unit may be linked to at least one of the first jig and the second jig. The heating unit 140 heats the test object 110 by heating the jigs. The controlling unit 160 may be electrically connected with the heating unit 140 and may control the operation of the heating unit 140. Therefore, the heating unit 140 heats the test object 110 to a predetermined temperature according to the control command input from the controlling unit 160. Finally, a graph illustrating the shut-down temperature may be plotted by the display unit 190.

Preferably, the heating unit 140 may be a hot wire installed in the second jig 130. The hot wire may be installed in the first jig 120, not the second jig 130, or may be installed in both the first jig 120 and the second jig 130. In a variant, the hot wire may be installed on the other surface where the first jig 120 or the second jig 130 is in contact with the test object. Particularly, the heating unit 140 may increase the temperature gradually as a function of time. Herein, the heating unit 140 may be electrically connected with the controlling unit 160, and may supply heat to the first jig or the second jig under the control of the controlling unit 160. In this manner, it is possible to observe the thermal properties of the porous sheet interposed between the first jig and the second jig. The heating unit 140 may be electrically connected with the temperature sensor 150.

The temperature sensor 150 may be electrically connected with each of the first jig 120 and the second jig 130. In other words, the temperature sensor 150 may be connected to both ends of each jig. For example, the temperature sensor 150 may be directly connected with each of the first jig 120 and the second jig 130. For example, the temperature sensor 150 may be provided in the first jig 120 or the second jig 130.

The temperature sensor 150 measures the temperature of the porous sheet heated by the heating unit 140.

According to the present disclosure, when the temperature sensor 150 measures the temperature of the porous sheet, the temperature of the porous sheet is room temperature, before the temperature is increased by the heating unit 140. However, when heat is supplied to the porous sheet by the heating unit 140, the temperature of the porous sheet is increased with the lapse of a predetermined time. The temperature sensor 150 measures the temperature increased in this case.

According to the present disclosure, the air permeability-determining unit 170 is directly linked to at least one of the first jig and the second jig. For example, the air permeability-determining unit 170 may be directly linked to the first jig or the second jig. For example, the air permeability-determining unit may be linked to the first jig.

Particularly, the air permeability (Gurley value)—determining unit 170 determines the air permeability (Gurley value) based on the following principle. The air permeability-determining unit is directly linked to the first jig 120 or the second jig 130.

In addition, when air is injected to the test object 110 combined with the first and the second jigs 120, 130 under a predetermined pressure, the air undergoes a change in pressure depending on the properties of the porous sheet as the test object 110. It is possible to determine the air permeability (Gurley value), which is a time required for a unit volume of air to pass through the porous sheet, by using the changed air pressure.

For example, determination of the air permeability may be carried out by the Oken air permeability tester (Asahi Seiko Co.). For example, determination of the air permeability may be carried out by measuring the time required for 100 cc of air to pass through the porous sheet with the Oken air permeability tester.

According to the present disclosure, the controlling unit 160 controls the heating unit 140 and the temperature sensor 150. In addition, the controlling unit 160 calculates the shut-down temperature of the porous sheet by using the temperature measured by the temperature sensor 150 as a function of time and the air permeability (Gurley value) of the porous sheet determined by the air permeability-determining unit 170.

The controlling unit 160 may be electrically connected to each of the heating unit 140, temperature sensor 150, air permeability-determining unit 170, first jig 120 and the second jig 130. For example, the controlling unit 160 may be directly linked to the heating unit 140, temperature sensor 150 and the air permeability-determining unit 170. For example, the controlling unit may be linked to the first jig 120 and the second jig 130.

The controlling unit 160 receives the temperature measured by the temperature sensor 150 as a function of time and the air permeability (Gurley value) of the porous sheet determined by the air permeability-determining unit 170 as a function of time, while heat is supplied to the porous sheet by the heating unit 140 to an extent increasing with time, and the temperature and the air permeability may be taken as X axis and Y axis, respectively, to calculate the shut-down temperature of the porous sheet. Herein, X axis means the temperature (° C.) as a function of time, and Y axis means a change in air permeability (sec/100 cc) (Gurley value) of the porous sheet as a function of time. The controlling unit 160 can calculate the shut-down temperature of the porous sheet from the temperature and the air permeability (Gurley value) received from the temperature sensor 150 and the air permeability-determining unit 170.

The controlling unit 160 can store the calculated shut-down temperature of the porous sheet in the storage unit 180. Then, the temperature corresponding to an air permeability (Gurley value) of 100,000 sec/100 cc, when the temperature is increased as a function of time, is defined as the shut-down temperature.

The controlling unit 160 may display the calculated shut-down temperature of the porous sheet on the display unit 190. The display unit 190 may output the shut-down temperature of the porous sheet determined for the test object 110 by the controlling unit 160 through an external display. For example, the results of calculation of the shut-down temperature of the porous sheet may be output through a display in the form of letters, numbers, images, or the like. The results of calculation of the shut-down temperature of the porous sheet may include the shut-down temperature of the porous sheet, shut-down change profile, or a combination thereof.

The display unit 190 may be electrically connected to the controlling unit 160, and the controlling unit 160 may output the results of the shut-down temperature or a change profile thereof through the display unit 190. The display unit 190 may include a liquid crystal display, an organic light-emitting diode display or a light-emitting diode display, but the scope of the present disclosure is not limited thereto.

Meanwhile, the system for detecting a defective porous sheet according to an embodiment of the present disclosure further includes a judging unit 200. The judging unit 200 determines whether a porous sheet is defective or not through the comparison with a predetermined temperature. For this purpose, the controlling unit 160 outputs the shut-down temperature of the porous sheet to the judging unit. Then, the judging unit 200 receives the shut-down temperature of the porous sheet calculated by the controlling unit 160, and then compares the shut-down temperature with a predetermined reference value and may output information about whether the porous sheet is defective or not through an external display (not shown). In other words, the judging unit 200 may judge a porous sheet as a defective porous sheet, when the shut-down temperature of the porous sheet is higher than the reference value. The evaluation results of judging whether the porous sheet is defective or not based on the shut-down temperature of the porous sheet may be output in the form of letters, numbers or images through a display.

For example, the judging unit 200 determines a porous sheet as a defective porous sheet, when the porous sheet shows a shut-down temperature higher than the reference value by 0.5° C. or more. Particularly, when a porous sheet shows a shut-down temperature higher than the reference value by 0.5-3° C., or 0.5-1.5° C., the judging unit may determine the porous sheet as a defective porous sheet. In other words, according to the present disclosure, there is an advantage in that it is possible to detect whether a porous sheet is defective or not more simply by determining the shut-down temperature of the porous sheet, before the porous sheet is coated with a porous coating layer.

The judging unit 200 may display the determined result about whether the porous sheet is defective or not on a display unit 190. The display unit 190 may output the result about whether the porous sheet is defective or not, determined by the judging unit 200 for the test object 110, through an external display. For example, the result of detecting whether the porous sheet is defective or not may be output in the form of letters, numbers or images through a display. The result of calculation of the shut-down temperature of the porous sheet may include the shut-down temperature of the porous sheet, shut-down change profile, whether the porous sheet is defective or not, or a combination thereof.

When the shut-down temperature of the porous sheet is calculated as a higher temperature than the predetermined temperature, it can be estimated that the porous sheet is manufactured at a higher temperature. Such a porous sheet manufactured at a higher temperature shows no significant difference in terms of air permeability, but the morphology observed from the porous sheet shows fibrils having significantly non-uniform thicknesses and rough surfaces. When such a defective porous sheet is coated with a porous coating layer, the air permeability is increased abnormally.

The display unit 190 may be electrically connected with the judging unit 200, and the judging unit 200 may output the results of the physical properties determined from the porous sheet through the display unit 190. The display unit 190 may include a liquid crystal display, an organic light-emitting diode display or a light-emitting diode display, but the scope of the present disclosure is not limited thereto.

The storage unit 180 is not limited to any particular type, as long as it is a storage medium capable of recording and eliminating information. For example, the storage unit 180 may be RAM, ROM, EEPROM, DRAM, SDRAM, a resistor, a hard disc, an optical recording medium or a magnetic recording medium. The storage unit 180 may be electrically connected to the controlling unit 160 through a data bus, or the like, so that it may be approached by the controlling unit 160. In addition, the storage unit 180 may be electrically connected to the judging unit 200 through a data bus, or the like, so that it may be approached by the judging unit 200. The storage unit 180 may storage, renew, eliminate and/or transmit data generated when programs and/or controlling logics, including various controlling logics performed by the controlling unit 160 and the judging unit 200, are carried out. The storage unit 180 may be divided into two or more units logically. The storage unit 180 may be included in the controlling unit 160 or the judging unit 200, but is not limited thereto.

FIG. 2 is a schematic view illustrating the constitution of the system for detecting a defective porous sheet according to an embodiment of the present disclosure.

Referring to FIG. 2, the system 100 for detecting a defective porous sheet may include two jigs 120, 130 facing each other, a heating unit 140 linked to the two jigs 120, 130, a temperature sensor 150, a controlling unit 160, an air permeability-determining unit 170 and a judging unit 200. The system may further include a storage unit 180 and a display unit 190.

Referring to FIG. 2, the system 100 for detecting a defective porous sheet may hold a test object 110 between the first jig 120 and the second jig 130.

Figure 3:
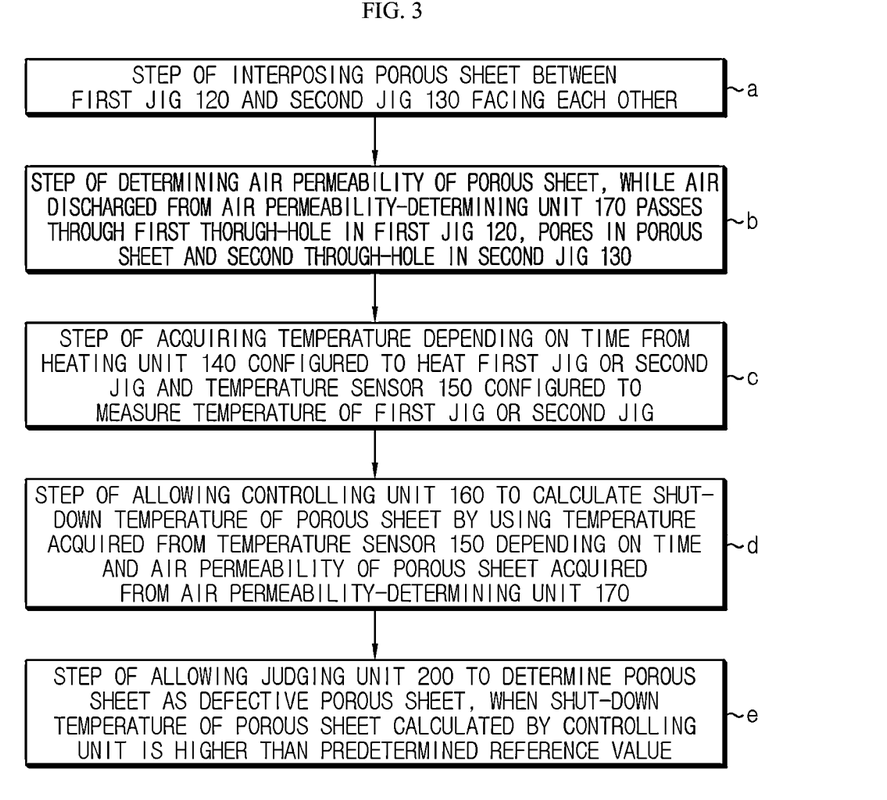
FIG. 3 is a flow chart illustrating the method for detecting a defective porous sheet.

FIG. 3 is a flow chart illustrating the method for detecting a defective porous sheet according to an embodiment of the present disclosure.

Referring to FIG. 1 and FIG. 3, in the method for detecting a defective porous sheet according to an embodiment of the present disclosure, the test object 110, i.e. separator, is interposed first between the first jig and the second jig facing each other (a). Thus, the test object 110 is fixed between the jigs 120, 130, and the fixing method is not particularly limited.

The test object may be a separator. For example, the test object may be a porous polymer substrate itself. However, as used herein, the term 'separator' refers to one not provided with a porous coating layer.

Referring to FIG. 1 and FIG. 3, the test object 110 is interposed between the first jig 120 and the second jig 130, and then the air permeation time, i.e. air permeability (Gurley value) of the porous sheet as a function of time is measured, while heating the test object 110 (b). Particularly, the air permeability of the porous sheet may be determined, while the air discharged from the air permeability-determining unit 170 passes through the first through-hole in the first jig 120, pores in the porous sheet and the second through-hole in the second jig 130 sequentially (b).

Referring to FIG. 1 and FIG. 3 again, the temperature sensor 150 measures the temperature of the test object as a function of time, while the test object 110 is heated (c). Particularly, the temperature may be acquired as a function of time from the heating unit 140 configured to heat the first jig or the second jig and the temperature sensor 150 configured to measure the temperature of the first jig or the second jig (c).

Then, the controlling unit 160 supplies heat increasing with time between the first jig 120 and the second jig 130, to which the test object 110 is inserted, by using the heating unit 140. Herein, the controlling unit 160 measures the temperature input constantly from the heating unit 140 by the temperature sensor 150 and records the temperature in the storage unit 180. In addition, the controlling unit 160 stores the air permeability (Gurley value) received from the air permeability-determining unit 170 in the storage unit 180.

After that, the controlling unit 160 determines the shut-down temperature of the separator from a change in temperature as a function of time, received from the temperature sensor 150, and the air permeability (Gurley value) of the porous sheet received from the air permeability-determining unit 170 (d). The controlling unit 160 may output the determined shut-down temperature through the display unit 190. In addition, the controlling unit may display the shut-down temperature change profile of the porous sheet on the display unit 190. Herein, the controlling unit 160 may refer the data recorded in the storage unit 170.

Referring to FIG. 1 and FIG. 3, when the shut-down temperature of the porous sheet calculated by the controlling unit is higher than a predetermined temperature by 0.5° C. or more, the judging unit 200 determines the porous sheet as a defective porous sheet. The judging unit 200 may output the result about whether the porous sheet is defective or not through the display unit 190. Herein, the judging unit 200 may refer the data recorded in the storage unit 170.

Hereinafter, the method for evaluating the insulation properties of a separator for an electrochemical device depending on the structure of a test object will be explained in more detail with reference to examples. However, the following examples are for illustrative purposes only, and the scope of the present disclosure is not limited thereto.

In the description of various embodiments of the present disclosure, it is to be understood that the constitutional elements called 'unit' are not physically differentiated elements but are functionally differentiated elements. Therefore, each constitutional element may be optionally integrated with another constitutional element, or each constitutional element may be divided into sub-elements in order to carry out control logic(s) efficiently. However, it is apparent to those skilled in the art that even when such constitutional elements are integrated or divided, the integrated or divided constitutional elements should be interpreted as being within the scope of the present disclosure.

The present disclosure has been described in detail with reference to preferred embodiments and drawings. However, it should be understood that the detailed description and specific examples are given by way of illustration only, since various changes and modifications within the scope of the disclosure will become apparent to those skilled in the art from this detailed description.

EXAMPLE 1-1

First, 30 kg of high-density polyethylene (Daehan Oil & Chem. VH035) having a weight average molecular weight of 380,000 as a polyolefin was introduced to an extruder, and 70 kg/hr of liquid paraffin oil (Kukdong Oil & Chem. LP 350F, having a dynamic viscosity of 67.89 cSt at 40° C.) as a diluting agent was introduced thereto, and extrusion was carried out at a temperature of 200° C.

Then, the molten polyethylene was molded into a sheet-like shape through a T-die and cold casting roll. Then, biaxial orientation was carried out by using a tenter type sequential orientation machine performing MD orientation and then TD orientation. Both of MD orientation and TD orientation were carried out at a ratio of 5.5. The orientation temperature was 108° C. in MD and 123° C. in TD.

After that, the diluting agent in the oriented sheet was extracted with methylene chloride, and the sheet from which the diluting agent was extracted was thermally fixed out at 125° C. to obtain a porous sheet having a thickness of 9.1 μm and an air permeability of 62 sec/100 cc.

The shut-down temperature of the porous sheet was determined by using the system for detecting a defective porous sheet at a heating rate of 5° C./min. The shut-down temperature was 144.8° C. The results are shown in the following Table 1, FIG. 5 and FIG. 6.

EXAMPLE 1-2

A porous coating layer was formed on the porous sheet according to Example 1-1. Particularly, polyvinylidene fluoride-co-hexafluoropropylene as a binder polymer was introduced to acetone as an organic solvent and dissolved therein at 50° C. for about 4 hours to prepare a binder polymer solution. Next, $Al_2O_3$ (particle size: 500 nm) as inorganic particles was introduced to the binder polymer solution, and the inorganic particles were pulverized and dispersed by using a ball milling process for 12 hours to prepare slurry for forming a porous coating layer. Herein, the weight ratio of the inorganic particles:binder polymer was 70:30.

The slurry for forming a porous coating layer was applied to both surfaces of the porous sheet according to Example 1-1 through a dip coating process at 23° C. under a relative humidity of 40% to a total loading amount of 13.5 $g/m^2$, followed by drying, to obtain a separator having porous coating layers. The test results are shown in the following Table 2.

Comparative Example 1-1

A porous sheet having a thickness of 9.1 μm and an air permeability of 63 sec/100 cc was obtained in the same manner as Example 1-1, except that the TD orientation temperature was set to 133° C.

The shut-down temperature of the porous sheet was determined by using the system for detecting a defective porous sheet at a heating rate of 5° C./min. The shut-down temperature was 145.9° C. The results are shown in the following Table 1, FIG. 5 and FIG. 6.

Comparative Example 1-2

A separator was obtained in the same manner as Example 1-2, except that the porous sheet according to Comparative Example 1-1 was used. The test results are shown in the following Table 2.

Comparative Example 2-1

A porous sheet having a thickness of 9.0 μm and an air permeability of 64 sec/100 cc was obtained in the same manner as Example 1-1, except that the TD orientation temperature was set to 130° C. and the thermal fixing temperature was set to 126° C. The shut-down temperature of the porous sheet was determined by using the system for detecting a defective porous sheet at a heating rate of 5° C./min. The shut-down temperature was 145.6° C. The results are shown in the following Table 1.

Comparative Example 2-2

A separator was obtained in the same manner as Example 1-2, except that the porous sheet according to Comparative Example 2-1 was used. The test results are shown in the following Table 2.

TABLE 1

|  |  | Example 1-1 | Comp. Ex. 1-1 | Comp. Ex. 2-1 |
|---|---|---|---|---|
| Physical properties of porous polymer substrate before being coated with porous coating layer | Thickness (μm) | 9.1 | 9.1 | 9.0 |
|  | Air permeability (sec/100 cc) | 62 | 63 | 64 |
|  | Porosity (%) | 43.9 | 46.9 | 46.1 |
|  | Shut-down temperature (° C.) | 144.8 | 145.9 (1.1° C. as compared to passed product) | 145.6 (0.8° C. as compared to passed product) |

TABLE 2

|  |  | Example 1-2 | Comp. Ex. 1-2 | Comp. Ex. 2-2 |
|---|---|---|---|---|
| Physical properties of porous polymer substrate after being coated with porous coating layer | Thickness (μm) | 17.3 | 17.1 | 17.2 |
|  | Air permeability (sec/100 cc) | 252 | 521 | 509 |
|  | *Judged as defective when shut-down temperature is higher than shut-down temperature of passed product by 0.5° C. or more | | | |

Referring to Example 1-1 and Comparative Examples 1-1 and 2-1 in Table 1, they have an air permeability of 62 sec/100 cc, 63 sec/100 cc and 64 sec/100 cc, respectively, and thus show no significant difference in air permeability itself.

On the contrary, when comparing Example 1-2 with Comparative Examples 1-2 and 2-2 in Table 2, Comparative Example 1-1 shows an air permeability of 521 sec/100 cc, which is approximately 207% based on Example 1-2, and Comparative Example 2-2 shows an air permeability of 509 sec/100 cc, which is approximately 202% based on Example 1-2.

In other words, although Example 1-1, Comparative Example 1-1 and Comparative Example 1-2 have equivalent or similar physical properties, they show a significant difference in air permeability after forming a porous coating layer.

Figure 5:
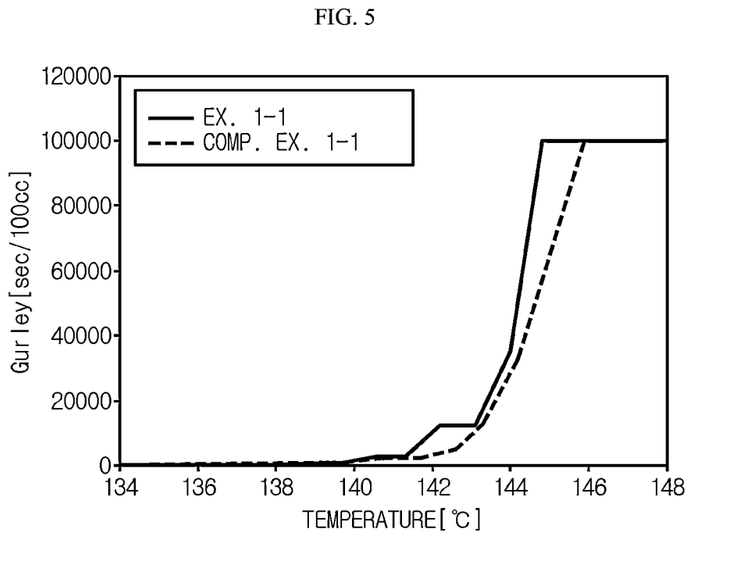
FIG. 5 is a graph illustrating the air permeability of each of the porous sheets according to Example 1-1 and Comparative Example 1-1.
Figure 6A:
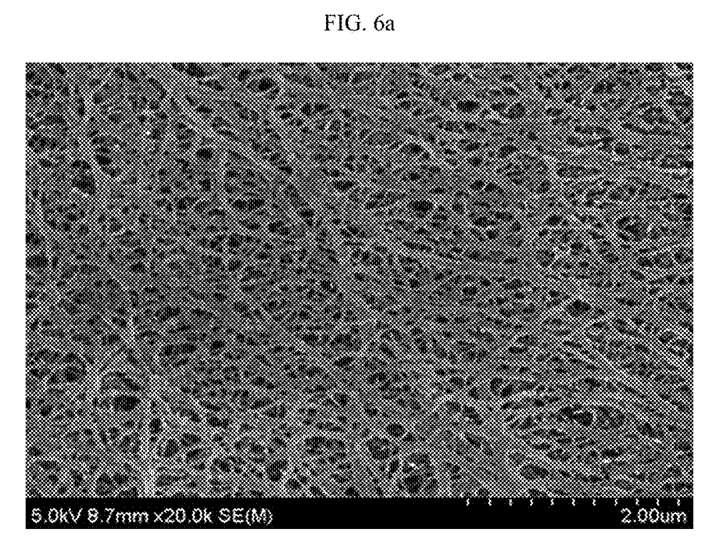
FIG. 6a and FIG. 6b are scanning electron microscopic (SEM) images illustrating the surface of the porous sheet according to Example 1-1 and that of the porous sheet according to Comparative Example 1-1, respectively.
Figure 6B:
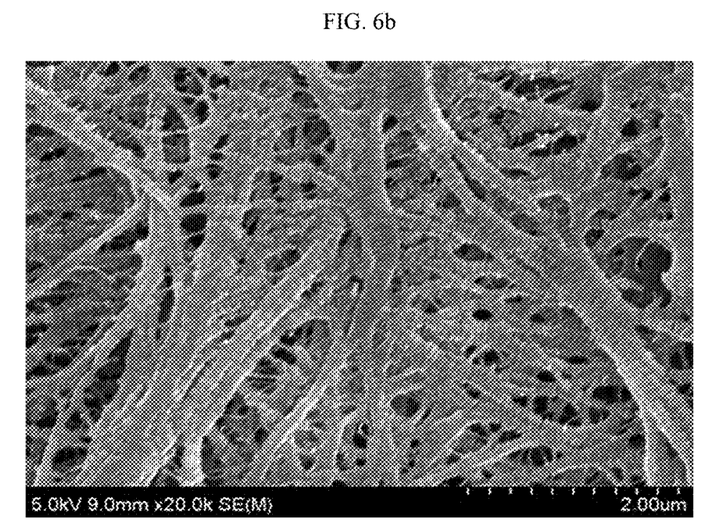

FIG. 5 is a graph illustrating the air permeability of the porous sheet according to each of Example 1-1 and Comparative Example 1-1. The defective product according to Comparative Example 1-1 shows an increase in air permeability at a slightly high temperature, when increasing the temperature. This suggests that the defective porous sheet is manufactured at a higher temperature as compared to the normal porous sheet. FIG. 6a and FIG. 6b are scanning electron microscopic (SEM) images illustrating the surfaces of the porous sheets according to Example 1-1 and Comparative Example 1-1, respectively. When comparing FIG. 6a with FIG. 6b, all of the porous sheets have an equivalent level of air permeability, i.e. 62 sec/100 cc and 63 sec/100 cc, respectively. However, the fibrils show a significant difference. In the case of FIG. 6b, the fibrils have significantly non-uniform thicknesses and rough surfaces as observed from the morphology. When such a defective porous sheet is coated with a porous coating layer, the air permeability is increased abnormally. To solve the above-mentioned problem, the inventors of the present disclosure detect a defective porous sheet beforehand by using the shut-down temperature of the porous sheet itself in order to reduce a defect rate.

1) Method for Determining Thickness

The thickness of each of the separators and porous polymer substrates was measured by using a thickness gauge (VL-50S, available from Mitutoyo Co.).

2) Method for Determining Porosity

The porosity was determined according to the following Formula 1 by using the true density of the polymer used for a porous polymer substrate and the packing density calculated from the area, thickness and weight of a porous polymer substrate.

$$\text{Porosity (\%)} = \{1 - (\text{Packing density}/\text{True density})\} \times 100 \tag{1}$$

DESCRIPTION OF DRAWING NUMERALS

100: System for detecting defective porous sheet
110: Test object
120: First jig
130: Second jig
140: Heating unit
150: Temperature sensor
160: Controlling unit
170: Air permeability-determining unit
180: Storage unit
190: Display unit
200: Judging unit

What is claimed is:

1. A system for detecting a defective porous sheet, comprising:
   an air permeability-determining unit capable of determining air permeability (Gurley value) of porous sheet;
   a first jig arranged on one side of the porous sheet and having a first through-hole through which air discharged from the air permeability-determining unit can be introduced;
   a second jig arranged on other side of the porous sheet which is an opposite surface of the one side of the porous sheet, and having a second through-hole through which air passing through the first through-hole and pores in the porous sheet can be introduced;
   a heating unit capable of heating the first jig or the second jig;
   a temperature sensor capable of measuring temperature of the first jig or the second jig;
   a controlling unit capable of controlling the heating unit and the temperature sensor, wherein the controlling unit is capable of calculating shut-down temperature of the porous sheet by using the temperature measured by the temperature sensor as a function of time and the air permeability (Gurley value) of the porous sheet determined by the air permeability-determining unit;

a display unit capable of displaying the shut-down temperature of the porous sheet calculated by the controlling unit; and a judging unit capable of determining whether the porous sheet is defective or not, wherein the judging unit is capable of determining the porous sheet as a defective porous sheet, when the shut-down temperature of the porous sheet calculated by the controlling unit is higher than a predetermined reference value by 0.5° C. or more, and the first through-hole is a first hole that goes through an entire thickness of the first jig, and the second through-hole is a second hole that goes through an entire thickness of the second jig, and the porous sheet to be determined is not coated with a porous coating layer.

2. The system for detecting a defective porous sheet according to claim 1, wherein the air permeability-determining unit is linked to the first jig, and the controlling unit is linked to the first jig and the second jig.

3. The system for detecting a defective porous sheet according to claim 1, wherein the heating unit and the temperature sensor are linked to at least one of the first jig or the second jig.

4. The system for detecting a defective porous sheet according to claim 1, wherein the porous sheet can be interposed during operation between the first jig and the second jig.

5. The system for detecting a defective porous sheet according to claim 1, further comprising a display unit capable of displaying the temperature in an X axis as and the air permeability (Gurley value) of the porous sheet in a Y axis.

6. The system for detecting a defective porous sheet according to claim 1, wherein the shut-down temperature is a temperature corresponding to the air permeability (Gurley value) of 100,000 sec/100 cc, when the temperature is increased as a function of time.

7. The system for detecting a defective porous sheet according to claim 1, wherein the first through-hole and the second through-hole have an average diameter of 2-15 mm.

8. The system for detecting a defective porous sheet according to claim 1, further comprising a storage unit capable of recording the shut-down temperature of the porous sheet calculated by the controlling unit.

9. A method for detecting a defective porous sheet, using the system according to claim 1, comprising:

interposing a porous sheet between a first jig and a second jig facing each other;

determining air permeability of the porous sheet, while air discharged from an air permeability-determining unit passes through a first through-hole in the first jig, pores in the porous sheet and second through-hole in the second jig sequentially;

acquiring temperature as a function of time from the heating unit heating the first jig or the second jig and temperature sensor measuring temperature of the first jig or the second jig;

calculating shut-down temperature of the porous sheet by a controlling unit using the temperature acquired from the temperature sensor as a function of time and the air permeability of the porous sheet acquired from the air permeability-determining unit; and determining the porous sheet as a defective porous sheet by a judging unit, when the shut-down temperature of the porous sheet calculated by the controlling unit is higher than a predetermined reference value by 0.5° C. or more, wherein the porous sheet is determined as a defective before the porous sheet is coated with a porous coating layer.

10. The method for detecting a defective porous sheet according to claim 9, wherein the shut-down temperature is a temperature corresponding to the air permeability (Gurley value) of 100,000 sec/100 cc, when the temperature is increased as a function of time.

* * * * *